United States Patent [19]

Lindner et al.

[11] Patent Number: 5,434,203
[45] Date of Patent: Jul. 18, 1995

[54] MIXTURES OF BISPHENOLS AND GRAFT POLYMERS

[75] Inventors: Christian Lindner; Holger Lütjens, both of Cologne; Karl-Erwin Piejko, Bergisch Gladbach, all of Germany

[73] Assignee: Bayer Aktiengesellschaft, Leverkusen, Germany

[21] Appl. No.: 293,276

[22] Filed: Aug. 19, 1994

Related U.S. Application Data

[63] Continuation of Ser. No. 562,830, Aug. 6, 1990, abandoned.

[30] Foreign Application Priority Data

Aug. 18, 1989 [DE] Germany .......... 39 27 318.0

[51] Int. Cl.⁶ .......................... C08K 5/13
[52] U.S. Cl. .................... 524/155; 524/171; 524/339; 524/343
[58] Field of Search ........... 524/155, 171, 329, 343

[56] References Cited

U.S. PATENT DOCUMENTS

| | | | |
|---|---|---|---|
| 3,414,636 | 12/1968 | Ott et al. | 524/326 |
| 3,700,754 | 10/1972 | Schmitt et al. | 524/343 |
| 3,852,391 | 12/1974 | Kubota et al. | 524/343 |
| 3,984,940 | 10/1976 | Reich et al. | 524/343 |
| 4,918,124 | 4/1990 | Eichenauer et al. | 524/255 |

FOREIGN PATENT DOCUMENTS

| | | |
|---|---|---|
| 225510 | 6/1987 | European Pat. Off. |
| 6409718 | 2/1965 | Netherlands. |
| 7200034 | 1/1972 | Netherlands. |

*Primary Examiner*—Peter D. Mulcahy
*Attorney, Agent, or Firm*—Connolly & Hutz

[57] ABSTRACT

Powdery mixture of from 1 to 99 weight % of a graft polymer of resin-forming monomers on a rubber and from 99 to 1 weight % of a bisphenol and the use thereof for improving chemical materials.

3 Claims, No Drawings

MIXTURES OF BISPHENOLS AND GRAFT POLYMERS

This application is a continuation of application Ser. No. 07/562,830, filed on Aug. 6, 1990, now abandoned.

This invention relates to powdery mixtures of from 1 to 99 weight % of a graft polymer of resin-forming monomers on a rubber and from 99 to 1 weight % of a bisphenol and to the use thereof for improving chemical materials.

Graft polymers of resin-forming monomers on rubbers, called graft polymers below, serve as, among other things, additives in chemical materials, for example, for improving the impact strength. In the case of themoplastic plastics, a graft polymer may be incorporated by melt compounding. For thermoset plastics, on the other hand, this is not possible.

Graft polymers of the type indicated are, depending on composition, more or lest sticky substances. In powder form, they tend to agglomerate more or less. Agglomerated products cause difficulties, however, when being incorporated into chemical materials, in particular where cross-linked material is concerned. A mocrodisperse distribution is often quite impossible.

There is a need, therefore, for graft polymers which are available as non-sticky powders and a need for graft polymers in a form which may be incorporated into thermoset plastics.

The powdery mixtures according to the present invention meet both requirements. They represent, on the one hand, stable, non-agglomerating powders of the graft polymer which are suitable for incorporating into thermoplastics and, on the other hand, because of the bisphenol content, a component for the production of thermoset plastics.

For example, the mixtures according to the present invention may react irreversibly with epoxy resins in a known manner via the hydroxyl groups of the bisphenols contained with the formation of high polymeric substances, during which the graft polymers uniformly distributed in the present mixture pass into the newly-formed high polymer also in uniform distribution.

The mixtures in accordance with the present invention may in principle be produced in any mixing ratio of bisphenols and graft polymers. Only those mixtures, however, in which the content of neither of the two components is less than 1 weight % have practical importance.

If graft polymers having very high rubber contents and especially strong tendency to stick together on storage are used, then a bisphenol content of at least 10 weight % is necessary for a good powder quality of the mixture.

Mixtures according to the present invention for the production of duromers preferably contain from 1 to 50 weight % of graft polymer and from 99 to 50 weight % of bisphenol, more preferably from 5 to 25 weight % of graft polymer and from 95 to 75 weight % of bisphenols.

Generally prefered, accordingly, are mixtures of from 10 to 95 weight %, more preferably from 15 to 25 weight % of bisphenols and from 90 to 5 weight %, more preferably from 85 to 5 weight % of graft polymer.

Particularly suitable bisphenols for the mixtures according to the present invention are those corresponding to Formula (I):

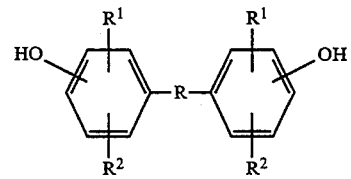

wherein
$R^1$, $R^2$ represents H, $C_1$–$C_4$ alkyl or halogen, preferably, H, $CH_3$, Cl or Br;
R represents a single bond, $C_1$–$C_{12}$ alkylene or arylene, preferably

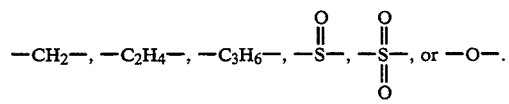

Examples of such bisphenols are:

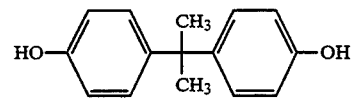

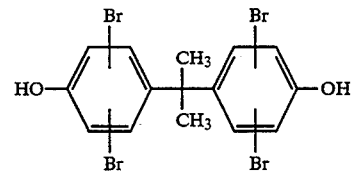

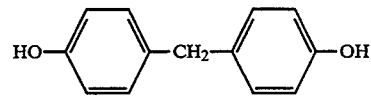

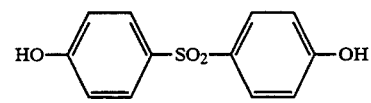

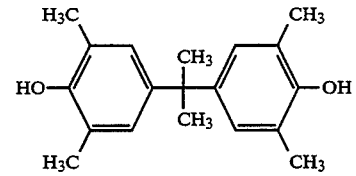

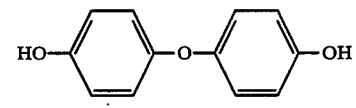

Preferred graft polymers contain as graft base a particulate partially cross-linked rubber and as grafted layer polymers of olefinically unsaturated monomers. They are, in general, predominantly thermoplastic.

The graft bases (rubbers) preferably have mean particle diameters ($d_{50}$) of from 0.08 to 1.5 microns, more preferably from 0.1 to 0.5 micron, and gel contents )as measure of the cross-linking) of >20 weight %, more preferably >50 weight % and in particular >70 weight %.

The graft polymers preferably contain from 20 to 95 weight % rubber and from 80 to 5 weight % graft-polymerized resin-forming monomers (grafted layer). They are prepared in a known manner by polymerization of the resin-forming monomers in presence of the rubber. In the course of this, a part of the resulting polymer of the resin-forming monomers is chemically bound (grafted on) to the rubber. In addition, free polymer of the resin-forming monomers is produced. The product of graft polymerization, that is the mixture of the true graft polymer and the free polymer of the monomers to be grafted, is regarded as the graft polymer in the present context.

The rubbers used as graft base have softening temperatures below 0° C. Dience, acrylate, olefin and silicone rubbers are suitable.

The grafted layer is produced from olefinically unsaturated monomers, expecially by polymerization of ethylene, propylene, vinyl acetate, vinyl propionate, $C_1$–$C_{10}$ alkyl acrylate (especially methyl, ethyl, butyl and hexyl acrylate), butadene, isoprene, vinyl chloride, vinylidene chloride, vinylidene fluoride, styrene, p-methylstyrene, α-methylstyrene, chlorostyrene, bromostyrene, acrylonitrile, methacrylonitrile, $C_1$–$C_{10}$ alkyl methacrylate (especially methyl, ethyl and hexyl methacrylate), maleimide, maleic anydydride, maleate esters, acrylamide, methacrylmide, vinyl urethanes, vinyl ethers or mixtures thereof. Expecially preferred grafting monomers are styrene, alkyl acrylate, alkyl methacrylates and acrylonitrile, as will as mixtures thereof.

Preferred graft bases are butadiene, isoprene and chloroprene polymers, which possibly contain copolymerized comonomers, such as acrylonitrile, styrene, vinyl acetate, vinyl ethers or alkyl acrylate. Especially preferred are the homopolymers. Also preferred are olefin rubbers, e.g. copolymers of ethylene with vinyl acetate, alkyl acrylate or propylene. Suitable acrylate rubbers are polymers of acrylic acid $C_1$–$C_8$ alkyl esters, e.g. methyl, butyl, octyl and 2-ethylhexyl esters of acrylic acid, which may contian up to 40 weight % of other vinyl monomers copolymerized.

The acrylate rubbers may be cross-linked through copolymerizing small amounts of polyfunctional monomers. Examples of such monomers are:

Esters of unsaturated carboxylic acids with a polyol (preferably from 2 to 20 carbon atoms in the exter group), such as ethylene glycol dimethacrylate, esters of a polybasic carboxylic acid with an unsaturated alcohol (preferably from 8 to 30 carbon atoms in the ester group), such as triallyl cyanurate, triallyl isocyanurate; divinyl compounds, such as divinylbenzene; esters of unsaturated carboxylic acids with unsatruated alcohols (preferably from 6 to 12 carbon atoms in the ester group), such as allyl methacrylate; phosphate esters, for example triallyl phosphate; and 1,3,5-triacryloylhexahidro-s-triazine. Especially preferred polyfunctional monomers are triallyl cyanurate, triallyl isocyanurate, triallyl phosphate, ally methacrylate, ethylene glycol dimethacrylate and 1,3,5-triacryloylhexahydro-s-triazine.

The amount of the polyfunctional monomers used for cross-linking is preferably from 0.05 to 10 weight % more preferably from 0.1 to 5.0 weight % (related to the total amount of cross-linked acrylate rubber). Other suitable acrylated rubbers have the core/shell structure, having for example a core of cross-linked butadiene (cf. EP 34748).

Silicone rubbers are preferably cross-linked and contain units of formulae (II) to (V).

($R'_2SiO$)

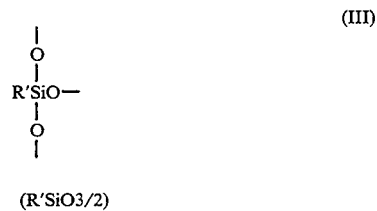

($R'SiO_{3/2}$)

$R'_3SiO-$    (IV)

($R'_3SiO_{\frac{1}{2}}$)

and

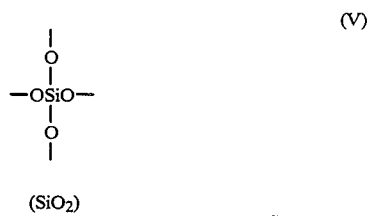

($SiO_2$)

wherein

R' represents a monovalent organic group.

Monovalent organic groups R' are, e.g. organic groups having from 1 to 40 carbon atoms, e.g. alkyl groups, preferably $C_1$–$C_{10}$ alkyl, aryl groups, preferably $C_6$–$C_{24}$ aryl, alkylaryl groups, preferably $C_7$–$C_{30}$ alkylaryl, arylalkyl groups, preferably $C_7$–$C_{30}$ aralkyl, $C_1$–$C_{20}$ alkyxy and $C_1$–$C_{20}$ thioalkyl.

Especially preferred are: methyl, ethyl, t-butyl, phenyl, methylphenyl, bisphenyl, phenylmethyl. Also to be considered are $C_1$–$C_{10}$ alkoxy groups and groups which may suffer radical attack, such as vinyl and mercaptopropyl groups.

Preferably at least 80% of all R goups are methyl. Especially preferred are combinations of methyl and ethyl.

For 100 moles of $R_2SiO$ units, there are preferably from 0 to 10 moles of $RSiO_{3/2}$ units from 0 to 1.5 moles of $R_3SiO_{\frac{1}{2}}$ units and from 0 to 3 moles of $SiO_2$ units.

Preferred silicone rubbers contain incorporated units of groups which may suffer radical attack. These are capable of radical addition or gransfer reactions. Such groups are preferably vinyl, allyl, chloroalkyl, and mercapto groups, preferably in amounts of from 2 to 10 mole % related to the groups R.

Especially preferred silicone rubbers are particulate polymers having a core/shell structure.

For production of the mixtures according to the present invention, the graft polymers must be available as aqueous emulsion (latex). Such emulsions may be obtained by polymerizing the graft polymers in aqueous emulsions in the presence of a rubber latex. This type of production of graft polymers is known.

For the production of the mixtures according to the present invention, the aqueous emulsion of a graft polymer may be combined with an aqueous solution of an alkali metal bisphenolate, the mixture is coagulated at pH <7, and the coagulate is isolated in powder form.

In more detail, the process may be carried out as follows:

Emulsions of graft polymers such as result from the production of the graft polymers are used. These normally contain up to 60 weight %, especially up to 45%, polymer. Aqueous solutions of the bisphenolates are simply obtained by dissolving the bisphenols at from 20° to about 100° C. in aqueous alkale metal hydroxide solutions, the alkali metal hydroxides being used in stoichiometric amounts relative to the phenolic groups of the bisphenols. These bisphenol salt solutions usually contain from 5 to 20 weight %. The emulsion and the solution are mixed in the desired ratio and the mixture is then coagulated.

The coagulants used are aqueous solutions of acids (carboxylic acids or mineral acids, such as acetic acid, fromic acid, propionic acid, hydrochloric acid, sulphuric acid and phosphoric acid), possibly together with water-soluble salts, such as NaCl, $MgSO_4$, $Na_2SO_4$, $CaCl_2$. These coagulants have themselves a pH value <7, especially <5. Coagulation is generally carried out at from 20° to 100° C., preferably from 50° to 85° C.:

Method A:

The graft polymer emulsion is mixed with the bisphenol salt solution in the desired mixing ratio. In order that on mixing there shall be no problems, such as latex creaming or partial coagulation, certaim pH conditions and emulsifiers for the graft polymer emulsions are required. The resulting mixtures must have a pH >7. If graft polymer emulsions are used which themselves already have a pH >7, there are usually no problems on mixing. If graft polymer emulsions are used which have a pH <7, it is advisable first to adjust these emulsions to a pH >7 by addition of aqueous alkaline solutions, and only then to mix with the bisphenol salt solution.

The graft polymer emulsions contain artionic emulsions, e.g. resin soaps, the disproportionated derivatives thereof, alkyl sulphonates, substituted aryl sulphonates or long-chain alkylcarboxylic acids, such as oleic acid.

The resulting mixture is then coagulated in the temperature range indicated at pH <7, preferably at pH <5.

Method B:

This method may be used inter alia when the graft polymer emulsions cannot be mixed with the bisphenol salt solution without problems.

In this method, the graft polymer emulsion and the bisphenol salt solution are fed separately, but simultaneously, into a precipitation medium with simultaneous mixing and precipitation. Temperatures and pH values are as in Method A.

The aqueous mush of graft polymer and bisphenol obtained by method A or B is then separated by filtration from the aqueous phase, washed and dried to a powder by conventional methods.

The mixtures according to the present invention are non-sticky, storage-stable powders having particle diameters of from 200 microns to 2 mm. The mixtures may be used in the production of duromers, which are produced via addition or condensation reactions, especially in epoxy resin systems, in which, because of the well-dispersed graft copolymers, they bring about improvement of the mechanical properties, without problems (spots) with the moulding surfaces. On the other hand, the mixtures may be used for improvement in the thermoplastic moulding compounds which already contain graft polymers and bisphenols as components, e.g. in thermoplastic polyamide blends. Here the mixtures according to the present invention bring about a more uniform mutual distribution of the components during the compounding. Moulding compounds produced in this way exhibit, amoung other things, an improved aging and processing stability. The so-called "processing latitude" for the manufacturer of plastics articles is increased.

EXAMPLES

1. Production of a bisphenol A salt solution 80 parts, by weight, of NaOH and 228 parts, by weight of bisphenol A are dissolved in 1972 parts, by weight, of water at room temperature.

2. Graft polymer emulsions used 2.1 Graft polymer of 30 weight % methyl methacrylate on 70 weight % cross-linked poly(butyl acrylate) rubber (particle diameter ($d_{50}$) of the rubber—0.5 micron, gel content 91 weight %), produced by radical graft polymerization in emulsion. The graft polymer emulsion has a pH of 3.5 and a polymer solid content of 39.5 weight %. The emulsifier is the Na salt of $C_{14}$–$C_{18}$ alkyl sulphonic acids. The originally-acidic emulsion was adjusted to a pH of 12 by addition of a 10 weight % caustic soda solution.

2.2 Graft polymer of 20 weight % styrene-acrylonitrile (72/28) copolymer on 80 weight % cross-linked polybutadiene (particle diameter ($d_{50}$)=0.4 micron, gel content 93 weight %), produced by radical graft polymerization in emulsion. The graft polymer emulsion has a pH of 10 and a polymer solids content of 39.3 weight %. The emulsifier is the sodium salt of disproportionated abietic acid.

2.3 As 2.1, but without treatment with caustic soda solution (pH 3.5).

Production of the mixtures from emulsion and bisphenol salt solution 3.1

| No. | Type  | Parts, by weight | Parts by weight solution 1 |
|-----|-------|------------------|----------------------------|
| 1   | 2.1   | 455              | 200                        |
| 2   | 2.1   | 354              | 600                        |
| 3   | 2.1   | 253              | 1000                       |
| 4   | 2.2   | 254              | 1000                       |
| 5   | 2.3*  | 254              | 1000                       |

*comparison: not made alkaline

While the mixtures 1 to 4 may be prepared perfectly and no coagulate forms on mixing, with mixture 5 there is a partial precipitate of the mixture components, which may be sedimented and filtered off.

3.2 Work-up to powder 3.2.1 The mixtures 3.1 (Nos 1, 2, 3, 4 ) are worked-up to powder as follows:

A mixture of: 300 parts, by weight, water 91 parts, by weight, 10% sulphuric acid 6 parts, by weight, NaCl is provided at 50° C. While stirring, 317 parts, by weight, of each of the mixtures 3.1 (Nos. 1. 2. 3. 4) is dosed in over 15 minutes at 50° C.

After cooling to 20° C., the mixture is filtered, followed by washing with water and drying at 60° C. The resulting materials possess a good powder quality; the powder becomes finer with increasing bisphenol A content (cf. 3.1 nos. 1, 2, 3).

3.2.2 Comparison

If the graft polymer emulsion 2.1, 2.3 and 2.2 are coagulated under the same conditions as described above, after drying, rubbery, lumpy materials are obtained, which tend to stick together on storage.

3.2.3 A mixture of 300 parts, by weight, water 140 parts, by weight, 10% sulphuric acid 6 parts, by weight, NaCl is provided. At 23° C., while stirring, 333 parts, by weight, solution 1 and 84 parts, by weight, of the acid emulsion 2.1 are fed in as separate streams over 15 min. The resulting mixture is filtered and dried in the way described in 3.2.1. A fine, pourable powder, which is stable in storage, is obtained.

4. 2304 parts, by weight, of 2,2-bis-(4-oxiranyl-methoxyphenyl)-propane with an oxirane equivalent weight of 192 are heated, with stirring, to from 75° to 80° C., 3 parts, by weight, of 50 weight % aqueous caustic soda solution are added and the mixture is then stirred well for 30 min. At from 75° to 80° C., 1316 parts, by weight, of the powder 2.1 are now added over ½ hr, while allowing the temperature to rise to 115° C.

The mixture is now reacted for 5 hours at 195° C. After cooling, toluene is added (3000 parts, by weight) and the organic phase is washed with water until the wash water shows a neutral reaction. Then, the organic solvent is evaporated off. The resulting product is a glassy, opaque resin, which has a softening point of 72° C. It may be hardened with epoxy resin hardeners directly, or used as a component in conventional epoxy resins.

The resulting moulding compositions exhibit improved behaviour on impact loading under near-practical conditions.

We claim:

1. Powdery mixtures consisting of a) 90 to 5% by weight of a graft polymer of resin forming monomers grafted onto a rubber and b) 10 to 95% by weight of a bisphenol of the formula

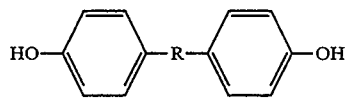

wherein R is —$CH_2$—, —$C_2H_4$—, —$C_3H_6$—,

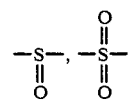

or O.

2. Mixtures according to claim 1 in which the graft polymers are thermoplastic polymers which are built up from a particulate, partially cross-linked rubber as graft base and a grafted polymer of olefinically unsaturated monomers.

3. Process for the production of mixtures according to claim 1, characterised in that the aqueous emulsion of a graft polymer is coagulated in presence of an aqueous solution of alkali metal salts of bisphenols at pH <7 and the coagulated worked-up to powder.

* * * * *